United States Patent [19]

Yasuda et al.

[11] Patent Number: 4,475,137

[45] Date of Patent: Oct. 2, 1984

[54] MAGNETIC TRANSDUCER

[75] Inventors: Isao Yasuda, Katano; Yorinobu Yoshisato, Hirakata; Yoshihiko Kawai, Kyoto; Kazuaki Koyama, Hirakata, all of Japan

[73] Assignee: Sanyo Electric Co., Ltd., Osaka, Japan

[21] Appl. No.: 355,199

[22] Filed: Mar. 5, 1982

[30] Foreign Application Priority Data

May 11, 1981 [JP] Japan .............................. 56-68114[U]
Nov. 18, 1981 [JP] Japan ................................ 56-186026

[51] Int. Cl.³ .......................... G11B 5/12; G11B 5/22
[52] U.S. Cl. .................................... 360/126; 360/125; 360/119
[58] Field of Search ......... 360/126, 125, 127, 119–120

[56] References Cited

U.S. PATENT DOCUMENTS 4,115,827 9/1978 Gooch ............................ 360/125 X
4,404,608 9/1983 Yasuda et al. ...................... 360/126

Primary Examiner—John H. Wolff
Attorney, Agent, or Firm—Armstrong, Nikaido, Marmelstein & Kubovcik

[57] ABSTRACT

A magnetic transducer includes sendust center core having an opening and a head gap extending from the opening to one side of the center core, and a pair of reinforcing cores. Each of the reinforcing cores includes a ferrite plate and a glass member mounted on one side of the ferrite plate. The center core is sandwiched between the two reinforcing cores such that the glass members are located on opposite sides, respectively, of the center core where the head gap is formed, and that one side of the center core is in flush with, or projects from, respective side faces of the glass member. The glass member is formed by a material having an abrasiveness resistivity which is smaller than that of said center core.

8 Claims, 12 Drawing Figures

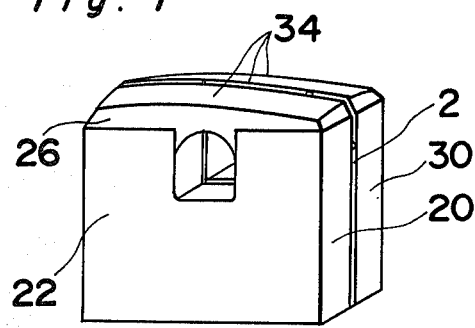
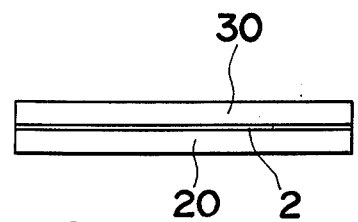
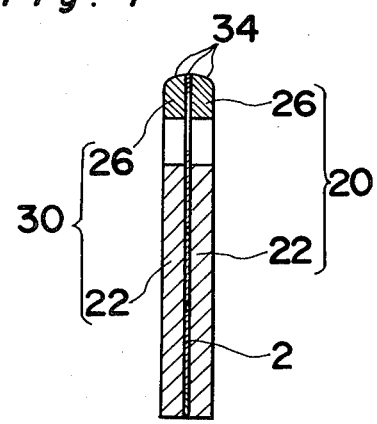
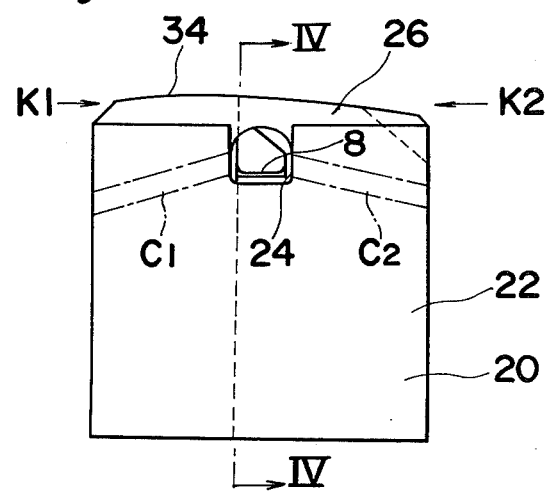
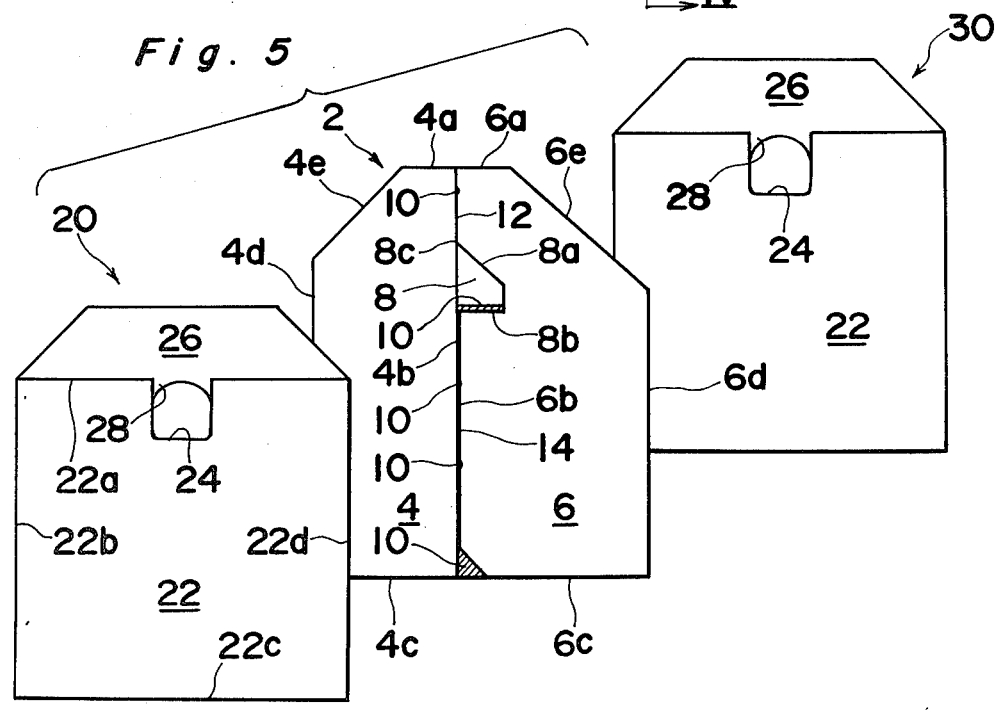

MAGNETIC TRANSDUCER

BACKGROUND OF THE INVENTION

The present invention relates to a magnetic transducer for recording and reproducing a high frequency signal on a magnetic medium and, more particularly, to an arrangement of an improved magnetic transducer.

The magnetic transducer of the above described type is used, e.g., in a video tape recorder. As a core material for the magnetic transducer, ferrite having a high ohmic resistance has been widely used. However, in a case where the magnetic medium is a high coercive tape, such as a so-called metal tape, the ferrite core may not sufficiently record or reproduce the signal because the saturation point of magnetization, or a saturation flux density ($B_s$), of the ferrite is comparatively low.

In consideration of the above, a material having a very large saturation flux density, such as sendust (Fe—Si—Al alloy), has recently been taking the place of ferrite as the core material. Furthermore, in order to record and reproduce a high frequency signal, the thickness of the sendust core is made very thin, such as several 10 s microns. Since such a thin sendust core is easy to break and easy to be worn out by the abrasion between core and running tape, it is reinforced by a pair of reinforcing cores which sandwich the sendust core therebetween. Each of the reinforcing cores is defined by a ferrite plate and a glass mounted on one side face of the ferrite plate. An example of such an arrangement is disclosed in U.S. patent application Ser. No. 231,321 filed Feb. 4, 1981 or in corresponding German Patent Application No. P 31 03 767.4 filed Feb. 4, 1981, and laid open to public inspection as Offenlegungsschrift No. 31 03 767 on Dec. 24, 1981, both of which are assigned to the same assignee as the present application.

When in use, a side face of the sendust core where a head gap is formed is made in flush with a side face of the glass, so that the magnetic tape may slidingly move past the face of the magnetic transducer. According to the prior art, a material for the glass is chosen in consideration of the hardness of the sendust core based on the Vicker's hardness test. More particularly, in the prior art magnetic transducer, the glass is so selected as to have a hardness much harder than the sendust core, and this selection is based on such an assumption that the glass members provided on both sides of the sendust core prevent wear down of the sendust core. According to the tests carried out by the present inventors, however, it has been found that, after a long period of operation, such a prior art arrangement has acceptable recording and reproducing abilities in a few cases, but poor in many other cases, particularly with respect to high frequency signals. According to a further investigation, it has been found that, after a long period of operation, some test pieces of magnetic transducer has its sendust core projecting above from, or in flush with, the level of the face of the glass members in 0.1 micron order, and many other test pieces had its sendust core worn down below said level in 0.1 micron order. The ones that showed poor recording and reproducing abilities are the latter ones, which disadvantageously forms a space between the face of the sendust core and the running tape. This can be understood from the spacing loss characteristic, as shown in FIG. 12, known to those skilled in the art. In the graph of FIG. 12, abscissa and ordinate represent $d/\lambda$ ($d$ is the distance of the space between sendust face and running tape, and $\lambda$ is wavelength of recorded signal) and spacing loss in dB, respectively. The graph of FIG. 12 shows that, as the distance d of the space increases, or as the wavelength becomes shorter, the spacing loss becomes more and more perceptible, resulting in poor recording and reproducing abilities.

From these tests, it has been concluded that the abrasion of the magnetic transducer has no relationship with the hardness of the material forming the transducer.

During the tests, it has also been found that the conventional magnetic transducer has such a disadvantage that the glass members mounted on the ferrite plate are easily dropped off, particularly after a long period of operation.

SUMMARY OF THE INVENTION

The present invention has been developed with a view to substantially solving the above problems and has for its essential object to provide an improved magnetic transducer.

It is another object of the present invention to provide a magnetic transducer of the above described type which provides acceptable recording and reproducing abilities even after a long period of operation.

It is a further object of the present invention to provide a magnetic transducer of the above described type which has glass members rigidly secured to the respective ferrite plates.

In accomplishing these and other objects, a magnetic transducer according to the present invention comprises a center core made of a material having a large saturation flux density and an opening formed therein for winding coil means therethrough with a head gap extending from the opening to one side of the center core, and a pair of reinforcing cores each comprising a glass member having an abrasiveness resistivity which is smaller than that of the center core. The pair of reinforcing cores sandwich the center core such that the glass members are located on opposite sides, respectively, of the center core where the head gap is formed, and that the one side of the center core is in flush with, or projects from, respective side faces of the glass members.

These and other objects and features of the present invention will become apparent from the following description taken in conjunction with preferred embodiment thereof with reference to the accompanying drawings, throughout which like parts are designated by like reference numerals, and in which:

FIG. 1 is a perspective view of a magnetic transducer according to the present invention;

FIG. 2 is a front view of the magnetic transducer shown in FIG. 1;

FIG. 3 is a top plan view of the magnetic transducer shown in FIG. FIG. 1;

FIG. 4 is a cross-sectional view taken along a line IV—IV shown in FIG. 2;

FIG. 5 is an exploded view of the magnetic transducer before the grinding process;

DESCRIPTION OF THE PREFERRED EMBODIMENTS

Figure 6:
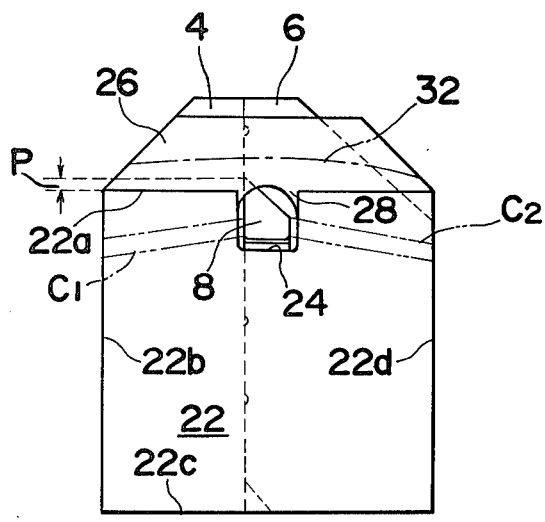
FIG. 6 is a front view of the magnetic transducer before the grinding process.

Referring to FIGS. 1, 2 and 3, a magnetic transducer according to the present invention comprises a center core 2 and a pair of reinforcing cores 20 and 30 sandwiching the center core 2. The center core 2 comprises two sections 4 and 6 which are bonded together at their sides to define a plain core member. Each of the reinforcing cores 20 and 30 comprises a ferrite plate 22 and a glass member 26 rigidly mounted on the ferrite plate 22. A further detail of the magnetic transducer of the present invention will become apparent from the following description taken in relation to the steps for manufacturing the magnetic transducer.

Referring particularly to FIG. 5, the center core 2 is prepared by two sheets 4 and 6, each formed by a material having a large saturation flux density, such as sendust, and each having a thickness corresponding to the thickness of track (for example 29 micron) that will be formed on a magnetic tape (not shown). The sendust sheet 6 shown on the right-hand side in FIG. 5 has a rectangular configuration defined by four sides 6a, 6b, 6c and 6d with a slanted side 6e. In the sendust sheet 6, a recess 8 is formed in the side 6b at a position close to the upper side 6a. The recess 8 is defined by a slanted side 8a which extends approximately parallel to the side 6e, and a bottom side 8b which extends perpendicularly to the side 6d. Furthermore the sendust sheet 6 has a corner defined by the sides 6b and 6c trimmed for the purpose of deposition of bonding agent.

The other sendust sheet 4 has a configuration similar to that of the sheet 6, but without the recess. More particularly, the sendust sheet 4 is defined by sides 4a, 4b, 4c, 4d and 4e. The sendust sheets 4 and 6 are joined side-by-side to define a single plain sheet, and their sides 4b and 6b are bonded with each other by the deposition of suitable bonding agent, such as silver alloy brazing material, at locations indicated by a reference character 10. When the sendust sheets 4 and 6 are joined together, the recess 8 now defines a window with its upper end 8c defining an acute corner. It is to be noted that before joining the sheets 4 and 6 together, a very thin film, such as 0.1 micron thick film, of $SiO_2$ is deposited on each of the sides 4b and 6b above the window 8 to provide a very narrow gap, such as 0.2 micron gap, between the sides 4b and 6b above the window 8. Such a gap above the acute corner 8c of the window 8 is referred to as a head gap. In contrast to the head gap, a similar gap is provided between the sides 4b and 6b below the window 8, and it is referred to as a back gap. In FIG. 5, solid lines 12 and 14 represent the head and back gaps, respectively.

A further detail of the manner how the sheets 4 and 6 are joined together is disclosed in the above described U.S. patent application Ser. No. 231,321 or in corresponding German patent Offenlegungsschrift 31 03 767.

The reinforcing cores 20 and 30 have the same structure with each other and each having a thickness of about 100 to 110 microns, which is determined in consideration of a space between upper and lower cylinders (not shown) provided in a video tape recorder. The reinforcing core, e.g., 20, is formed by a rectangular magnetic plate, such as a ferrite plate 22, and a nonmagnetic member, such as a glass member 26.

The ferrite plate 22 is defined by four sides 22a, 22b, 22c and 22d with a rectangular recess 24 formed approximately at the center of the upper side 22a. According to the preferred embodiment, the ferrite plate 22 is formed by a single crystal ferrite material such that the sides 22a and 22d coincide with the crystal faces (110) and (100), respectively, and a front face of the ferrite plate 22 coincides with the crystal face (110), so as to improve the reproducing ability. Instead of using the single crystal, it is possible to use a polycrystalline ferrite.

When the reinforcing core 20 is placed on the center sendust core 2, as shown in FIG. 6, the recess 24 aligns with the window 8 formed in the sendust core 2. Here, it is to be noted that the size of the recess 24 is greater than the window 8. This facilitates the winding of coils (not shown) at section C1 and C2 through the window 8. Furthermore, as apparent from FIG. 6, the left-hand vertical side of the recess 24 is located on the left-hand side of the left-hand edge of the window 8. In other words, an imaginary line extending from the head gap traverses the window 8. This prevents the shortcircuit of magnetic circuit at a proximate area of acute corner 8c of the window 8. Moreover, a distance P between the acute corner 8c of the window 8 and the upper side 22a of the ferrite plate 22 is selected to be about 100 to 200 microns. This distance P is determined in consideration of rigid structure and function of the ferrite plate 22.

Referring again to FIG. 5, the glass member 26 has a trapezoid configuration and is rigidly mounted on the upper side 22a of the ferrite plate 22. According to the preferred embodiment, the glass member 26 employed comprises the components of PbO, $SiO_2$, $K_2O$, NaO, $Sb_2O_3$ and $B_2O_3$ with the weight percentage of 59.5, 32.5, 7.12, 0.25, 0.49 and 0.14, respectively, and it has the softening point of 530° C., and thermal expansion coefficient of $102.0 \times 10^{-7}$. The glass member 26 shown has an arcuate projection 28 which extends downwardly from approximately the center of its base line for the engagement with the recess 24 formed in the ferrite plate 22. Although the rigid mounting of the glass member 26 on the ferrite plate 22 can be carried out by the use of a suitable bonding agent, preferably it is carried out by the following steps.

Figure 7:
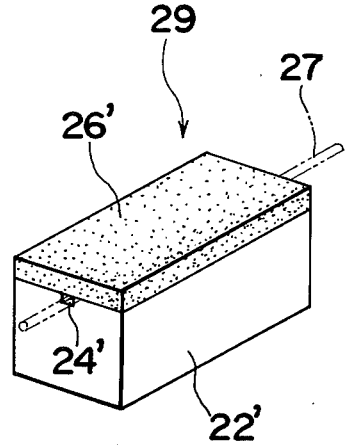
FIG. 7 is a perspective view of a composite block prepared for making numbers of slices of reinforcing core.
Figure 8:
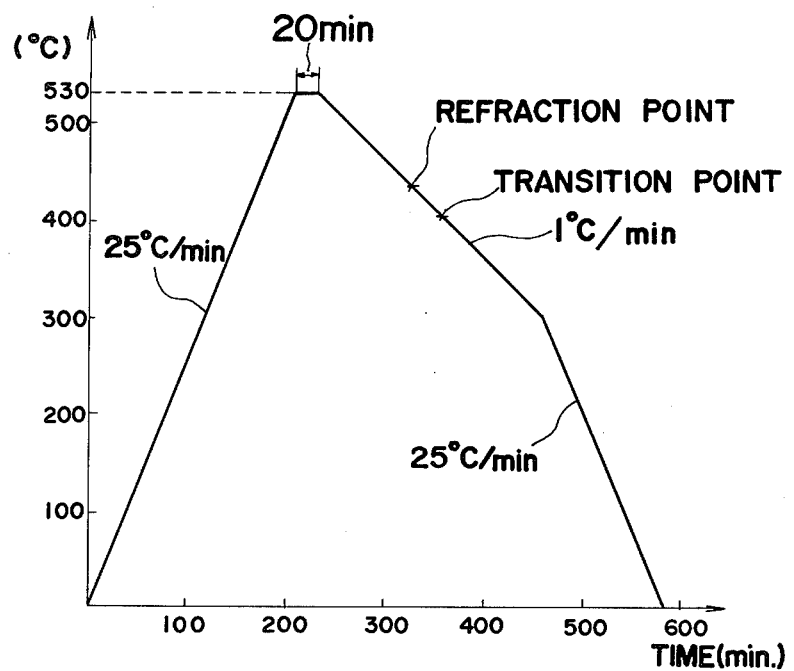
FIG. 8 is a graph showing a programmed temperature for heating the composite block of FIG. 7.

Referring to FIG. 7, first, a glass plate 26' of the above specified type is placed on an elongated ferrite block 22', having a rectangular cross-section groove 24' formed therein. The glass plate 26' and the ferrite block 22' are temporarily held together to define a composite block 29. A cylindrical rod 27 is tightly and slidingly inserted into a through-hole defined by the groove 24' and the glass plate 26'. Thereafter, the composite block 29 receiving the rod 27 is put in an electric furnace (not shown) in which the composite block 29 is heated according to a programmed temperature, as shown in FIG. 8, under an atmospheric pressure. When the temperature of the composite block 29 reaches the softening temperature (530° C.), the glass plate 26' is softened, and accordingly, the glass plate 26' is tightly adhered to the ferrite block 22' by way of welding and, at the same time, a region of the glass plate 26' located above the groove 24' droops downwardly into the groove 24' covering the rod 27 by the gravity force. Thereafter, when the composite block 29 is cooled down to the room temperature, it is taken out from the furnace, and the rod 27 is removed defining a projection on the glass plate 26' that fittingly engages in the groove 24'. Then, the corners of the glass plate 26' are cut off and the block 29 is sliced into thin films to present a plurality of reinforcing cores 20.

It is to be noted that the reinforcing core 30 has exactly the same structure as the reinforcing core 20 and is prepared by the same steps described above for the core 20.

Thereafter, the sendust core 2 and the reinforcing cores 20 and 30 thus prepared are placed one over the other in such a manner as to sandwich the sendust core 2 between the reinforcing cores 20 and 30, as shown in FIG. 6. Then, these three cores 2, 20 and 30 are bonded together by a suitable permeable organic adhesive intruded between the joining faces. When the cores 2, 20 and 30 are bonded together, its tapered end is grinded down to a curved broken line 32 shown in FIG. 6, to present a tape contact face 34, as best shown in FIG. 1. According to the preferred embodiment, the tape contact face 34 is curved not only when viewed from front along the line 32 but also it is curved when viewed from side, as best shown in FIG. 4. Furthermore, in the grinding step, the tape contact face 34 of the sendust core 2 is made in flush, or in slightly projected relation, with the tape contact face of the glass member 26. To complete the magnetic transducer, a suitable wire, e.g., a wire having a diameter of 0.03 to 0.04 mm, is wound at the sections C1 and C2 for 25 turns.

According to the present invention, the material for the glass member 26 is selected in consideration of the type of sendust employed for the center core 2, such that the amount of abrasion of the glass is greater than that of the sendust. In other words, the sendust core 2 has a higher abrasiveness resistivity than the glass member 26. When the material for the glass member 26 and for the sendust core 2 is selected according to the above principle, the upper end face of the sendust core 2 can be maintained in flush with, or in projected relation with, the grinded face of the glass member 26, even after a long period of operation, thus preventing no space between the magnetic tape that slides over the magnetic transducer and upper end face of the sendust core 2. In summary, the selection of material for the sendust core 2 and for the glass member 26 is based not on the hardness of these members 2 and 26, but only on their abrasion amount. The above fact will become more apparent from the result of the tests explained below.

In the first test, the present inventors prepared two samples of sendust cores A and B having different abrasion amount. They further prepared three samples of glass members C, D and E having different abrasion amount. It is to be noted that the components of the glass member C is identical to the glass member 26 explained above. According to the tests, the above samples are adopted in turn in a standard video tape recorder loaded with a so-called chromium tape, which slidingly runs over the magnetic transducer mounted with the test piece. The relative speed between the tape and the magnetic transducer is 6.9 m/s. For each sample, the amount of abrasion is measured after running the tape for a predetermined period of time, and the measured abrasion amounts are evaluated by normalizing the abrasion amount for the sendust core A as 100. A table shown below gives the result of the first test detecting the abrasion amount of each sample.

| Sample | Abrasion Amount | Vicker's hardness |
| --- | --- | --- |
| Sendust A | 100 | 440 |
| Sendust B | 105 | 460 |
| Glass C | 119 | 356 |
| Glass D | 92 | 402 |
| Glass E | 98 | 451 |

In the first test, the hardness of each sample was measured through Vicker's hardness test, and the obtained hardness is also shown in the above table for the comparison between the abrasion amount and hardness. As apparent from the table, the abrasion amount has no relation with the hardness.

In the second test, three magnetic transducers were prepared, all employing sendust A for the center core 2, but for the glass member 26 in the reinforcing cores 20 and 30, the first magnetic transducer employed glass C, the second employed glass D and the third employed glass E. The three magnetic transducers were adopted in turn in the video tape recorder and output characteristic was measured relative to the time. The result of the second test is shown in a graph of FIG. 9 in which abscissa represents time in hours an ordinate represents maximum voltage (peak to peak voltage) of reproduced signal having 4 MHz. In the graph, curves A-C, A-D and A-E represent output characteristics obtained when the above described first, second and third magnetic transducers, respectively, are employed.

Figure 10:
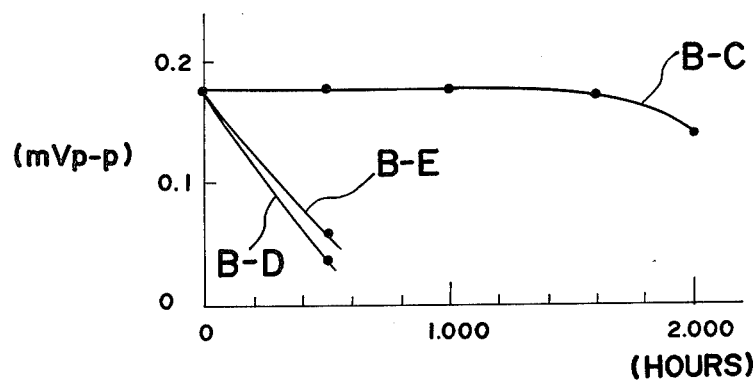
FIG. 10 is a graph similar to FIG. 9, but particularly showing the output characteristic of another three samples.
Figure 12:
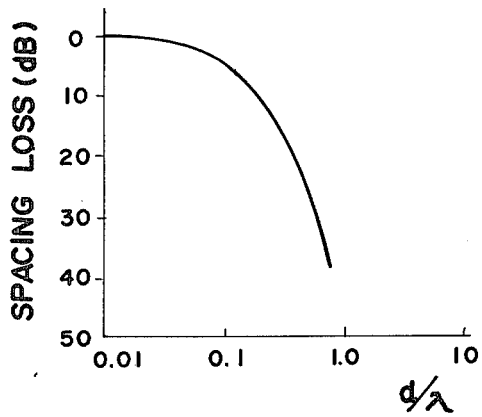
FIG. 12 is a graph showing relation between spacing loss and distance of the spacing or wavelength of the signal.

Similarly, in the third test, three magnetic transducers were prepared, all employing sendust B for the center core 2, but for the glass member 26, the first magnetic transducer employed glass C, the second employed glass D and the third employed glass E. These three magnetic transducers were tested in the same manner as in the second test, and the obtained results are shown in a graph of FIG. 10, in which abscissa and ordinate represent hours and maximum voltage, respectively. In the graph of FIG. 10, curves B-C, B-D and B-E represent respectively output characteristics obtained from the above described first, second and third magnetic transducers prepared for the third test.

As apparent from the graphs curves A-C and B-C show almost constant output level in the first 1500 hours. Whereas other curves slope down in a first short hours of time, only the curve A-E shows a constant output level after being sloped down to some degrees.

Figure 9:
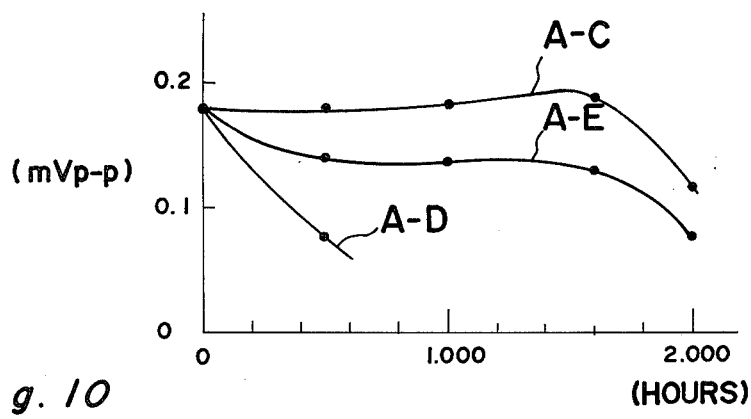
FIG. 9 is a graph showing an output characteristic of three samples of magnetic transducers with respect to time change.

When the results shown in FIGS. 9 and 10 are evaluated in consideration of the result of the first test shown in the above table, it can be said that the acceptable results (curves A-C and B-C) are obtained when the material for the glass member 26 is so selected as having abrasion amount greater than that of the material employed for the sendust core 2. In other words, the material for the glass member 26 is so selected as having smaller abrasiveness resistivity than the material for the sendust core 2. Furthermore, as apparent from the above table, the above evaluation does not necessarily mean that the acceptable results are obtained when the material for the glass member 26 is less hard than the material for the sendust core 2. If this is true, a reasonable result should be obtained for the combination of sendust A and glass D, or for the combination of sendust B and glass D. In fact, in the graphs of FIGS. 9 and 10, such combinations show very poor result.

As has been described fully in the foregoings, the magnetic transducer according to the present invention comprises a center core 2 and reinforcing cores 20 and 30 each containing glass member which is so selected as having a less abrasiveness resistivity than that of the center core 2. When this structure is taken, the center core 2 will not wear down below the face of the reinforcing cores 20 and 30, and thus, the center core 2 can be held in contact with the running tape even after a long period of operation. Furthermore, the face of the magnetic transducer that contacts with the tape is curved not only in the direction of tape advance, as shown in FIG. 2, but also in the tape's widthwise direction, as shown in FIG. 4. Accordingly, the contact pressure between the center core 2 and the running tape can be increased, resulting in an improvement in recording and reproducing abilities.

Also, according to the present invention, the glass member 26 is provided with a projection 28 which fittingly engages in the recess 24 formed in the ferrite plate 22. Accordingly, the glass member 26 is rigidly secured on the ferrite plate 22, increasing the resistivity against external force applied thereto in direction K1 or K2 (FIG. 2) by the running tape.

Figure 11:
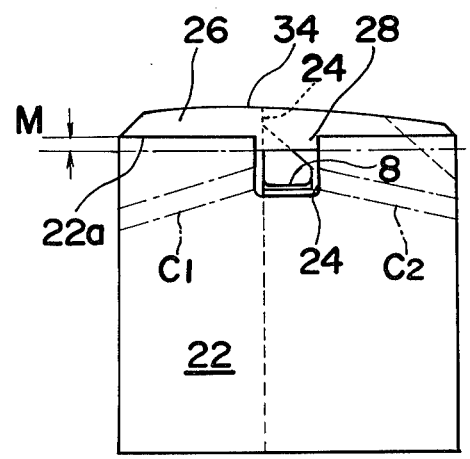
FIG. 11 is a view similar to FIG. 2, but particularly showing a modification thereof.

It is to be noted that such a projection 28 can be formed in any shape other than the arcuate, such as rectangular, as shown in FIG. 11, so long as the projection fittingly engages in the recess 24, but leaving a sufficient space in the recess 24 to permit the coil winding therethrough.

It is also to be noted that when such a projection 28 is provided, the upper side 22a of the ferrite plate 22 can be located close to the tape contact face 34 resulting in the increase of ferrite region. When compared with the prior art, the magnetic transducer according to the present invention has the upper side 22a located closer to the tape contact face 34 by a distance M, resulting in the decrease of distance between the head gap 24 and the ferrite plate 22, and this in turn results in decrease of magnetic resistance.

Although the present invention has been fully decribed with reference to the preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A magnetic transducer comprising:
   a center core made of a material having a large saturation flux density ($B_s$), said center core having an opening formed therein for winding coil means therethrough and a head gap extending from said opening to one side of said center core;
   a pair of reinforcing cores each comprising a glass member having an abrasiveness resistivity which is smaller than that of said center core, said pair of reinforcing cores sandwiching said center core such that the glass members are located on opposite sides, respectively, of the center core where said head gap is formed, and that said one side of the center core is in flush with, or projects from, respective side faces of said glass members.

2. A magnetic transducer as claimed in claim 1, wherein said center core is made of sendust.

3. A magnetic transducer as claimed in claim 1, wherein each of said reinforcing core further comprising a plate made of magnetic material, said magnetic plate fixedly connected to said glass member and having a recess formed therein at an intermediate portion of a side which is held in contact with said glass member, said recess defining a window together with said glass member, said window being aligned with said opening for receiving said coil means.

4. A magnetic transducer as claimed in claim 3, wherein an imaginary line extending from said head gap traverses said window thereby preventing a shortcircuit across the head gap by said magnetic plate.

5. A magnetic transducer as claimed in claim 3, wherein said glass member includes a projection which engages in said recess formed in said magnetic plate for the rigid connection between the magnetic plate and the glass member.

6. A magnetic transducer as claimed in claim 3, wherein said connection between said glass member and magnetic plate is an adhesive connection.

7. A magnetic transducer as claimed in claim 3, wherein said connection between said glass member and magnetic plate is a weld.

8. A magnetic transducer as claimed in claim 7, wherein said projection is a melt form.

* * * * *